United States Patent Office 3,758,448
Patented Sept. 11, 1973

---

3,758,448
COPOLYMERS AND HYDROGELS OF UNSATURATED ESTERS
Paul Stamberger, Baltimore, Md., assignor to Union Optics Corporation, Verona, Pa.
No Drawing. Filed Oct. 5, 1971, Ser. No. 186,821
Int. Cl. C08f 15/16
U.S. Cl. 260—86.1 E      4 Claims

ABSTRACT OF THE DISCLOSURE

Bulk polymerized, water insoluble but water swellable polymer of monomers comprising water soluble monoester of acrylic or methacrylic acid with a polyhydric alcohol; and glycidyl methacrylate, and/or glycidyl acrylate, and/or glycidyl crotonate. The polymer may be swelled in aqueous solution to provide a transparent hydrogel having excellent physical properties, and suitable in an ophthalmic lens.

BACKGROUND OF THE INVENTION

The present invention is related to novel bulk polymerized polymers which are water insoluble but are water swellable to form hydrogels which are transparent and which have excellent physical and optical properties. More particularly, this invention is related to shape retaining transparent articles obtained from such hydrogels and more particularly ophthalmic lenses such as contact lenses.

Recently considerable attention has been directed to obtaining polymers which are suitable for preparing hydrogels, and particularly those hydrogels useful as contact lenses.

For example, various sparingly cross-linked polymeric hydrogels have been previously disclosed. For instance, such sparingly cross-linked hydrogels can be obtained by simultaneously polymerizing a water soluble monoester of acrylic or methacrylic acid in which the ester moiety contains at least one hydrophilic group such as a hydroxy group, and cross-linking the monomer as it polymerizes with a polyunsaturated cross-linking agent such as an ethylene glycol dimethacrylate. The amount of such cross-linking agent is usually less than about 1 mole percent of the monoester. Such polymerizations are generally conducted in the presence of a redox initiator. For a more detailed discussion of these sparingly cross-linked polymeric hydrogels see U.S. Pats. 2,976,576 and 3,220,960 to Otto Wichterle et al., and see M. F. Refojo et al., "Journal of Applied Polymer Science," volume 9, pages 2425–2435 (1965). It seems evident from these disclosures that it is necessary to have sparingly cross-linked polymeric hydrogels so as to obtain materials which have properties suitable for use as contact lenses. In order to obtain a sparingly cross-linked material it is usually necessary to employ extremely small quantities of the polyunsaturated cross-linking agent. Such amounts usually are less than 1 mole percent of the monoester in the polymer.

One of the factors which determines the final properties of a hydrogel is the quantity of cross-linking agent employed. Since the quantity of cross-linking agent which is to be employed in these prior art materials is very small, the amount can only be varied slightly. Accordingly, it is not possible to effectively tailor the final properties of the hydrogel by varying the amount of cross-linking agent. Therefore although such polymers may have properties which provide suitable contact lenses, it is not possible to manipulate those properties to any appreciable extent by varying the quantity of cross-linking agent so as to tailor-make contact lenses possessing combinations of properties which may be desired for a particular application.

The above problem of restricting the quantity of cross-linking agent has been dealt with somewhat by Seiderman in U.S. Pat. 3,503,942. Seiderman discloses that amounts of cross-linking agent in excess of the sparing amount described in U.S. Pat. 2,976,576 can be employed in preparing hydrophilic polymers if certain quantities of certain alkyl acrylates or alkyl methacrylates are also incorporated in the polymer. Accordingly, Seiderman indicates that it is necessary to employ at least three different types of polymerizable monomers to form hydrogels suitable for contact lenses when quantities of cross-linking agents greater than the "sparing" amount disclosed in the above-mentioned Wichterle patents are used.

However, contrary to this it has been found that according to the present invention increased amounts of cross-linking agents can be present without the need of incorporating a third type of monomer as long as the materials, amounts, and type of polymerization disclosed in the present invention are observed. It has also been found, according to the present invention, that it is not necessary to employ ethylene glycol dimethacrylate or similar type of polyunsaturated material as the cross-linking agent in order to obtain hydrogels possessing those properties necessary to prepare acceptable ophthalmic lenses. Accordingly, it is possible according to the present invention to obtain hydrogels which can possess a whole range of suitable properties by correspondingly varying the relative amounts of the monomers used in the present invention. The present invention provides novel bulk polymerized copolymers obtained from water soluble monoesters of acrylic or methacrylic acid and a polyhydric alcohol, and certain hydrogel producing comonomers.

BRIEF DESCRIPTION OF INVENTION

The present invention is concerned with bulk polymerized water insoluble but water swellable optically clear copolymers of a monomer mixture comprising:

(A) from about 60 to 99.75% by weight of a polymerizable monoester of acrylic and/or methacrylic acid, and a polyhydric alcohol; and (B) from about 0.25 to about 40% by weight of glycidyl methacrylate and/or glycidyl acrylate and/or glycidyl crotonate; and hydrogels obtained therefrom.

DESCRIPTION OF PREFERRED EMBODIMENTS

The polymerizable monoesters which are suitable in obtaining the polymers of the present invention must be water soluble and should be capable of homopolymerizing to a water soluble material. Such polymerizable monoesters are monoesters of either acrylic and and/or methacrylic acid and a polyhydric alcohol and preferably a dihydric alcohol. Suitable dihydric alcohols which may be employed to form the esters used in the present invention include among others ethylene glycol, 1,3-propanediol, the dialkylene glycols such as diethylene glycol and dipropylene glycol; and the polyalkylene glycols such as polyethylene glycol and polypropylene glycol; 1,6-hexamethylene glycol; and 1,4-butanediol. Some suitable polyhydric alcohols which contain from 3 to 6 alcohol groups and which may be employed to form the ester used in the present invention include glycerol, trimethylol propane, trimethylolethane, pentaerythritol, and hexitols such as mannitol and sorbitol. Examples of some suitable polymerizable monoesters include hydroxy ethyl methacrylate, hydroxy ethyl acrylate, hydroxy propyl methacrylate, diethylene glycol monomethacrylate, diethylene glycol monoacrylate, glyceryl methacrylate, and pentaerythritol methacrylate, with the preferred polymerizable monoester being hydroxy ethyl methacrylate. The amount of polymerizable monoester employed in the monomeric mixture to prepare the polymers of the present invention is usually from about 60 to about 99.75% by weight, and is preferably from about 85 to about 97.5% by weight.

The other necessary monomer employed in preparing the polymers of the present invention are the glycidyl esters of either methacrylic acid, acrylic acid, or crotonic acid. The most preferred glycidyl ester is glycidyl methacrylate. The amount of glycidyl ester employed is usually between about 0.25 and about 40% by weight, and preferably between about 2.5 and about 15% by weight.

The above quantities of the water soluble monoester and the glycidyl ester are based upon the total weight of these materials in the monomer mixture but not necessarily upon the total weight of polymerizable materials since other monomers can be present as will be discussed hereinbelow.

It was surprisingly discovered according to the present invention that the glycidyl ester produces a water insoluble but water swellable material and that when employed it is not necessary to use the polyethylenically unsaturated cross-linking agents of the prior art such as the ethylene glycol dimethacrylates. For example, M. F. Refojo in an article entitled "Glyceryl Methacrylate Hydrogels" in the Journal of Applied Polymer Chemistry, volume 9, pages 3161–3170 (1965) indicates that the presence of glycidyl methacrylate in preparing hydrogel copolymers of glycerol methacrylate decreases the number of cross-links in a solution polymerized copolymer and subsequently increases the amount of water in the hydrogel.

The following statements by Refojo on pages 3165 and 3168 of that article are believed to be relevant to this discussion:

"The presence of glycidyl methacrylate in the copolymer seems to decrease the number of crosslinks in the network, subsequently increasing the amount of water in the hydrogel."

"As it is well known for gel systems, the amount of liquid found on swelling glyceryl methacrylate hydrogels is inversely proportional to the extent of crosslinking in the network (FIG. 2). Nevertheless, residual glycidyl methacrylate in the glyceryl methacrylate does not seem to be the cause of network formation, since the addition of glycidyl methacrylate to acqueous solution of glyceryl methacrylate and polymerization of the mixtures thereof yielded hydrogels which at equilibrium held even more water than the gels prepared under the same conditions but without the addition of glycidyl methacrylate . . . ."

Moreover, Steckler in U.S. Pat. 3,532,679 indicates that the glycidyl methacrylate in heterocyclic copolymers containing polyethlene glycol dimethacrylate cross-linking agents performs the same function as other unsaturated esters such as alkyl acrylates, alkyl methacrylates, and vinyl esters. Table 1 on columns 5 and 6 of that patent clearly shows that the use of the glycidyl methacrylate in such a copolymer gave properties essentially the same as copolymers containing various alkyl methacrylates and alkyl acrylates. Accordingly, it seems quite apparent from the disclosure of Steckler that glycidyl methacrylate could not be employed in place of the dimethacrylate.

Accordingly, it was quite surprising that the glycidyl ester of the present invention could be employed in preparing the water insoluble polymers of the present case and that it was not necessary to employ a polyethyllenically unsaturated material such as an ethylene glycol dimethacrylate to obtain polymers suitable for hydrogel formation.

In addition, it was surprisingly found that copolymers prepared from the above-described monomers contain all those properties which are crucial in manufacture of ophthalmic lenses such as contact lenses. To find suitable polymers is quite difficult since there are numerous properties which must be satisfied before a material can be utilized as a contact lens. However, it has been found that the polymers of the present invention do possess those qualities which are necessary for hydrogel contact lenses. Hydrogels obtained from water swellable polymers of the present invention have very good optical qualities, are transparent, elastic, and flexible.

The hydrogels obtained from the bulk polymerized copolymers of the present invention contain from about 10 to about 90% by weight of an aqueous liquid, and preferably contain from about 20 to about 60% by weight of an aqueous liquid. In addition, hydrogels can be obtained by swelling the polymers of the present invention with water soluble swelling agents instead of aqueous solutions. Some examples of water soluble swelling agents include ethylene glycol, the liquid polyethylene glycols, the glycol esters of lactic acid, formamide, dimethyl formamide, dimethyl sulfoxide, and the like. However, when the hydrogel is to be employed as a contact lens, it will be necessary to replace any water soluble liquid with the aqueous solution. The hydrogel contact lens should of course contain a physiological saline solution as the aqueous medium. This is in order to provide the contact lens which is in a state of osmotic equilibrium with physiological saline solution.

The polymers of the present invention are prepared employing bulk polymerization techniques. The term "bulk polymerization" as used herein includes those polymerizations carried out in the absence of a solvent or dispersing liquid as well as those polymerizations carried out in the presence of water or water soluble or polymer soluble swelling agents in such amounts as not to significantly alter the nature of the polymerization process. For example, the amount of water or other swelling agent must be less than the quantity of such material which is necessary to dissolve or disperse the monomers, thereby providing the monomers with a freedom of movement which changes the nature and mechanism of the polymerization.

In order to obtain hydrogels from the monomers used in the present invention which possess the optical and physical properties required by contact lenses, it is essential that the polymerization be carried out in bulk. Hydrogels obtained from solution polymerized polymers rather than bulk polymerized polymers of the monomers employed in this invention lack the necessary strength to be suitable as contact lenses, and may possess poor optical properties. The deficiencies of such solution copolymers are quite evident from the disclosure of Refojo et al. as discussed hereinabove. Contrary to the hydrogels from the solution polymerization, the water content of the hydrogels of the present invention at osmotic equilibrium generally decreases as the glycidyl ester content increases.

The polymerization catalyst employed can be any of the catalysts which are suitable in polymerizing compounds containing ethylenic unsaturation, and preferably are the free radical catalysts. Of particular interest are the azo type catalysts such as azobisisobutyronitrile and peroxide catalysts. Some examples of suitable peroxide catalysts include hydrogen peroxide, benzoyl peroxide, tert-butyl peroctoate, phthalic peroxide, succinic peroxide, benzoyl acetic peroxide, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl perbenzoate, acetyl peroxide, 2,4 - dichlorobenzoyl peroxide, urea peroxide, caprylyl peroxide, p-chlorobenzoyl peroxide, di-tert-butyl peroxide, 2,2 - bis(tert-butyl peroxy) - butane, hydroxyheptyl peroxide, the diperoxide of benzaldehyde, and the like.

The preferred catalyst is one which is effective at moderately low temperatures such as about 50–70° C. such as tert-butyl peroctoate.

In addition to the free radical polymerization catalyst, the catalyst can include those materials which accelerate polymerization primarily by opening of the epoxide group of the glycidyl ester. Such catalysts include p-toluene sulfonic acid, sulfuric acid, phosphoric acid, aluminum chloride, stannic chloride, ferric chloride, boron trifluoride, boron trifluoride-ethyl ether complex, and iodine. It may be desirable to employ a multistage polymerization process. For instance, the polymerization can initially be conducted until substantially all of the unsaturated grouping have polymerized, and then can be conducted to effect polymerization through the breaking of the oxirane group of the glycidyl ester and condensation.

The amount of catalyst employed depends upon the type of catalyst system used and is generally from about 0.01 to about 10 parts by weight per 100 parts of the monomer mixture, and preferably is from about 0.1 to about 1 part by weight per 100 parts of the monomer mixture.

The polymerization is generally carried out at temperatures from about room temperature to about 150° C. It is generally preferred to initiate the polymerization at relatively low temperatures such as from about 35 to about 85° C., and then increase the temperature to about 90 to about 150° C. as the reaction continues and preferably after most of the reaction has been completed. The most preferred initial temperature range of polymerization is between about 50 and 60° C. Usually the polymerization is conducted under autogenous pressure in a closed reaction vessel. However, any suitable means to prevent significant evaporation of any of the monomers can be employed.

Generally, the polymerization is completed in about 4 to about 24 hours and preferably is completed in about 6 to 18 hours. It is understood, of course, that the time and temperature are inversely related. That is, temperatures employed at the upper end of the temperature range will provide polymerization processes which can be completed near the lower end of the time range.

In addition, it may be desirable for the copolymers obtained from such polymerization to be post cured at temperatures somewhat higher than those initially employed in the polymerization. Usually the temperatures employed in the post cure will range from about 90° to about 150° C. Five hours is usually more than sufficient from such a post curing operation. Preferably the post cure is completed in one or two hours.

After the polymerization is completed, and usually after suitable shaping or machining operation, and after any water soluble impurities are leached out, the polymer can then be contacted with a suitable liquid in order to obtain the hydrogel materials which can then be employed as ophthalmic lenses.

The polymerization and post curing, if employed may be carried out in a mold or cast conforming to the general or exact shape and/or size of the desired product. After the polymer is completed including any post curing, a firm, rigid, and clear copolymer is obtained. The polymers of the present invention possess other important characteristics such as having excellent machineability and polishing characteristics. This material, if necessary, can then be further fabricated into various sizes and shapes or cut into the exact shape and size of a desired product. The fabricated product can then be swelled in a suitable liquid until equilibrium is reached or until a hydrogel containing the desired amount of liquid such as aqueous liquid is reached.

The hydrogels which can be obtained from the polymers of the present invention are clear and exhibit good tear resistance. Also the hydrogels may be elastic or may be rigid depending upon the relative amounts and specific monomers used. Moreover, they possess the necessary optical properties essential for ophthalmic devices.

The inclusion of other copolymerizable ethylenically unsaturated monomers in such amounts which do not drastically alter the properties of the polymers of the present invention is intended to come within the scope of the present invention. Such other monomers include alkyl acrylates, alkyl methacrylates, vinyl esters of saturated monocarboxylic acids, and methacrylates and/or acrylates of amino alcohols. Some specific monomers which can be present in the present invention include acrylamide; methacrylamide; alkyl methacrylates or acrylates wherein the alkyl group contains up to 22 carbon atoms such as methyl methacrylate, ethyl methacrylate, isopropyl methacrylate, butyl methacrylate, capryl methacrylate, palmityl methacrylate, stearyl methacrylate, lauryl methacrylate, ethyl acrylate, methyl acrylate, isopropyl acrylate, butyl acrylate, and lauryl acrylate; and vinyl esters of monocarboxylic acids wherein the acid contains up to about 22 carbon atoms such as vinyl acetate, vinyl propionate, vinyl butyrate, and vinyl stearate.

In order to better understand the present invention, the following examples are given wherein all parts are by weight unless the contrary is stated:

Example 1

90 parts of hydroxy ethyl methacrylate and 10 parts of glycidyl methacrylate are admixed with 0.4 part of tert-butyl peroctoate catalyst. The polymerization mixture is then poured into individual polypropylene stationary circular molds of ¾ inch inside diameter and ⅜ inch depth.

The polymerization of the material is effected by initially heating the mixture to about 50° C. for about 12 hours. The polymerization is then completed by heating for 1 hour at 90° C. and then heating for another hour at 120° C. After the polymerization is completed, a clear, firm, and rigid copolymer is obtained. The polymerized material is then placed on a conventional contact lens lathe such as one obtainable from Hardinge Brothers, Elmira, N.Y., and is then ground and polished. It is then contacted with physiological saline solution until it is in a state of osmotic equilibrium with the physilogical saline solution.

The hydroge lens obtained is clear, flexible, and elastic, has excellent optical properties, and has a water content of about 47% at osmotic equilibrium.

Example 2

Example 1 is repeated except that the amount of hydroxy ethyl methacrylate is 95 parts and the amount of glycidyl methacrylate is 5 parts. The results obtained are similar to those of Example 1 except that the hydrogel at osmotic equilibrium has a water content of about 48%.

Example 3

Example 1 is repeated except that the amount of hydroxy ethyl methacrylate is 97.5 parts and the amount of glycidyl methacrylate is 2.5 parts. The results obtained are similar to those of Example 1 except that the hydrogel at osmotic equilibrium has a water content of about 55%.

Example 4

Example 1 is repeated except that the amount of hydroxy ethyl methacrylate is 97 parts and the amount of glycidyl methacrylate is 1.3 parts. The results obtained are similar to those of Example 1 except that the hydrogel at osmotic equilibrium has a water content of about 49%.

Example 5

85 parts of hydroxy ethyl methacrylate and 15 parts of glycidyl methacrylate are admixed with 0.4 part of tert-butyl peroctoate catalyst. The polymerization mixture is then poured into individual polypropylene stationary circular molds of ¾ inch inside diameter and ⅜ inch depth.

The polymerization of the material is effected by heating the mixture to about 54° C. for about 18 hours. The polymerization is then completed by heating for 2 hours at 90° C. After the polymerization is completed, a clear, firm, and rigid copolymer is obtained. The polymerized material is then processed according to the method described in Example 1 to produce a hydrogel contact lens.

The hydrogel lens obtained is clear, flexible, and elastic, has excellent strength and optical characteristics, and has a water content of about 26.2% at osmotic equilibrium.

Example 6

Example 5 is repeated except that the amount of hydroxy ethyl methacrylate is 80 parts and the amount of glycidyl methacrylate is 20 parts. The results obtained are similar to those of Example 5 except that the hydrogel at osmotic equilibrium has a water content of about 23.4%.

Example 7

Example 1 is repeated except that the amount of hydroxy ethyl methacrylate is 70 parts and the amount of glycidyl methacrylate is 30 parts. The results obtained are similar to those of Example 5 except that the hydrogel at osmotic equilibrium has a water content of about 22.5%.

Comparison Example 8

Example 5 is repeated except that the amount of hydroxy ethyl methacrylate is 50 parts and the amount of glycidyl methacrylate is 50 parts. After the polymerization is completed, a hard polymer which absorbs only 8.4% water is obtained. The hydrogel is not suitable for preparing a contact lens since it is not flexible.

Comparison Example 9

Example 5 is repeated except that no hydroxy ethyl methacrylate is employed. The results obtained are similar to those of Example 8 except that the polymer does not absorb water.

Comparison Example 10

Example 1 is repeated except that no glycidyl methacrylate is employed. After the polymerization is completed, a clear but weak and very sticky polymer is obtained. The polymerized material is not strong enough to be machined or polished according to usual lens producing techniques.

A comparison of Examples 1–7 with Examples 8–10 clearly demonstrates the efficacy of the materials of the present invention as compared to those outside the scope of this invention.

The hydroxy ethyl methacrylate employed in all of the examples was purified by distilling under vacuum at about 100° C.

What is claimed is:

1. A water insoluble but water swellable optically clear copolymer consisting, essentially of a bulk polymerized monomer mixture consisting essentially of:
   (A) hydroxyethylmethacrylate, and
   (B) glycidyl ester selected from the group consisting of glycidyl acrylate, glycidyl methacrylate, glycidyl crotonate, and mixtures thereof; and wherein said monomer mixture contains based upon the combined weight of (A) and (B) from about 60 to 99.75% of (A) and from about 0.25 to 40% of (B).

2. The copolymer of claim 1 wherein said glycidyl ester is glycidyl methacrylate.

3. The copolymer of claim 1 wherein said monomer mixture contains based upon the combined weight of (A) and (B) is from about 85 to about 97.5% of (A) and from about 2.5 to 15% of (B).

4. The copolymer of claim 3 wherein said glycidyl ester is glycidyl methacrylate.

References Cited

UNITED STATES PATENTS

| | | | |
|---|---|---|---|
| 3,421,957 | 1/1969 | Kawpisz | 156—153 |
| 3,220,960 | 11/1965 | Wichterle et al. | 260—29.6 H |
| 3,503,942 | 3/1970 | Seiderman | 260—80.75 |
| 3,496,254 | 2/1970 | Wichterle | 260—29.6 H |

OTHER REFERENCES

Die Makromolekulare Chemie, 118 (1968) pp. 19–35.

HAROLD D. ANDERSON, Primary Examiner

U.S. Cl. X.R.

260—29.6 H, 29.6 TA, 80.73, 80.75, 80.81